(12) United States Patent
Doherty et al.

(10) Patent No.: US 8,606,497 B2
(45) Date of Patent: Dec. 10, 2013

(54) METHOD, SYSTEM AND COMPUTER PROGRAM FOR DETECTING AND MONITORING HUMAN ACTIVITY UTILIZING LOCATION DATA

(75) Inventors: Sean T. Doherty, Waterloo (CA); Lukasz Cwik, Waterloo (CA); Dominik Papinski, Waterloo (CA)

(73) Assignee: Salient Imaging, Inc., Milford, NH (US)

( * ) Notice: Subject to any disclaimer, the term of this patent is extended or adjusted under 35 U.S.C. 154(b) by 705 days.

(21) Appl. No.: 11/556,365

(22) Filed: Nov. 3, 2006

(65) Prior Publication Data

US 2008/0125959 A1    May 29, 2008

(51) Int. Cl.
*G01C 21/00* (2006.01)
(52) U.S. Cl.
USPC .......................................... 701/400; 701/408
(58) Field of Classification Search
USPC .......................................... 701/400, 408, 410
See application file for complete search history.

(56) References Cited

U.S. PATENT DOCUMENTS

| | | | |
|---|---|---|---|
| 6,898,518 B2 | 5/2005 | Padmanabhan | |
| 6,952,645 B1 | 10/2005 | Jones | |
| 6,961,658 B2 | 11/2005 | Ohler | |
| 7,327,245 B2* | 2/2008 | Krumm et al. | 340/501 |
| 2002/0111172 A1* | 8/2002 | DeWolf et al. | 455/456 |
| 2002/0143490 A1* | 10/2002 | Maeda et al. | 702/150 |
| 2002/0171673 A1* | 11/2002 | Brown et al. | 345/700 |
| 2005/0125148 A1* | 6/2005 | Van Buer et al. | 701/209 |
| 2006/0156209 A1* | 7/2006 | Matsuura et al. | 714/798 |
| 2006/0190822 A1* | 8/2006 | Basson et al. | 715/700 |
| 2007/0005243 A1* | 1/2007 | Horvitz et al. | 701/213 |

OTHER PUBLICATIONS

Bullock, P. J., P.R. Stopher, and F.N.F. Horst. Conducting a GPS Survey With Time-Use Diary. Presented at the 82nd Annual Meeting of the Transportation Research Board.
Doherty, S.T., N. Noel, M. Lee-Gosselin, C. Sirois and M. Ueno. Moving Beyond Observed Outcomes. In Transportarion Research Circular, pp. 449-466.
Asakura, Y. and E. Hato. Tracking Survey for Individual Travel Behaviour Using Mobile Communication Instruments. Transportation Research Part C. vol. 12, No. 3-4, 2004, pp. 273.
Doherty, S.T. 2000. Interactive Methods for Activity Scheduling Processes. In Goulias, K. Transportation Systems Planning pp. 7-1 to 7-25.
Doherty, S. T. and Papinski, D. 2004. Is It Possible to Automatically Trace Activity Scheduling Decisions? Paper presented at the Conference on Progress in Activity-based . . . .

* cited by examiner

*Primary Examiner* — Thomas Tarcza
*Assistant Examiner* — Imran Mustafa
(74) *Attorney, Agent, or Firm* — Hayes Soloway PC

(57) ABSTRACT

A method, system and computer program for detecting and displaying a person's activity-travel pattern over time and space is provided. Person-based location data is acquired by a personal communication device and processed in accordance with an algorithm. The invention goes beyond applications that focus on the detection of the current location of the user, but rather the enhanced knowledge of the users current, past, and likely future activities and their multi-dimensional attributes. The present invention can be implemented on common hardware and is easily accessible via web-based interfaces and reporting, making various applications achievable at very low cost.

21 Claims, 7 Drawing Sheets

| | | | | |
|---|---|---|---|---|
| [ Wed, Jul 7, 2005 ] [ Previous \| Today \| Next ] | | | | |
| Time | Event | Location | Other | |
| 7 Hours 37 Minutes [ fill ] | | | | |
| 7:37 AM – 7:47 AM | Activity | Residential | | ☒ |
| 7:47 AM – 7:50 AM | Trip: Auto | N/A | | ☒ |
| 7:50 AM – 8:03 AM | Activity | Residential | | ☒ |
| 8:03 AM – 8:05 AM | Trip: Walk | N/A | | ☒ |
| 8:05 AM – 5:36 PM | Activity | UNIVERSITY | | ☒ |
| 5:36 PM – 6:07 PM | Trip: Walk | N/A | | ☒ |
| 6:07 PM – 8:10 PM | Activity | Residential | | ☒ |
| 3 Hours 49 Minutes [ fill ] | | | | |

[ Add New (Blank) Entry ]

FIG. 6A

| | | | | |
|---|---|---|---|---|
| [ Wed, Jul 7, 2005 ] [ Previous \| Today \| Next ] | | | | |
| Time | Event | Location | Other | |
| 12:00 AM – 7:47 AM | Activity: AT HOME ⊞ | Home | | ☒ |
| 7:47 AM – 7:50 AM | Trip: Walk ⊞ | N/A | ◉ | ☒ |
| 7:50 AM – 8:03 AM | Trip: Bus ⊞ | N/A | ◉ | ☒ |
| 8:03 AM – 8:05 AM | Trip: Walk ⊞ | N/A | ◉ | ☒ |
| 8:05 AM – 5:36 PM | Activity: Work/School: Work ⊞ | The University | | ☒ |
| 5:36 PM – 6:07 PM | Trip: Walk ⊞ | N/A | ◉ | ☒ |
| 6:07 PM – 11:59 PM | Activity: AT HOME ⊞ | Home | | ☒ |

METHOD, SYSTEM AND COMPUTER PROGRAM FOR DETECTING AND MONITORING HUMAN ACTIVITY UTILIZING LOCATION DATA

FIELD OF THE INVENTION

The present invention relates to technology for tracking human beings. The present invention more particularly relates to the use of location data to monitor human activity.

BACKGROUND OF THE INVENTION

Over the past several decades, travel "diaries" have persisted as the main data collection tool for understanding and forecasting travel behaviour. Along the way, many enhancements, supplements and alternative delivery mechanisms have been developed to increase their accuracy, reduce respondent burden, and extend the types of information gathered. This includes the move to more activity-based and time-use diary methods. Increasing attention is also being paid to issues of data quality, standards, and non-response. Wholly new techniques have also emerged that incorporate or extend diaries in key ways to capture people's motives, decisions processes, and future behavioural responses. These include stated preference/adaptation surveys, gaming and simulation, panel surveys, cognition experiments such as "think aloud" protocols, activity scheduling process surveys, and a wide variety of qualitative approaches. Increasingly, new technologies such as computers, the Internet, and passive tracking technologies are also being used to support these efforts.

In particular, Global Positioning Systems (GPS) are receiving considerable attention and experimentation as a means to supplement and potentially replace travel diary methods. Most off-the-shelf GPS devices are capable of providing location accuracy (longitude, latitude, and altitude) within 5 to 10 meter accuracy. After a warm-up of 30-90 seconds, such devices can provide such information on a second-by-second basis if desired. When combined with a data logger such as a hand-held computer, GPS can passively provide a highly accurate trace of personal or vehicular movements over long periods of time.

Geographic Information Systems (GIS) are an ideal tool for storing, processing, and visualizing this data. Recent research has shown that it is possible through post-processing to accurately determine the vast majority of travel routes, traffic flows, trip start/end times, and trip stops (or activity locations) from GPS data.

For example, Bullock et al. utilized a combination of automated rules and by-hand techniques to successfully detect 91% of trips. (See Bullock, P. J., P. R. Stopher, and F. N. F. Horst. Conducting a GPS Survey with Time-Use Diary. Presented at The 82nd Annual Meeting of the Transportation Research Board, Washington, D.C., 2003.) A basic rule for identifying trip ends was first used, consisting of at least 120 seconds worth of stationary GPS points. Additional rules dealt with situations such as signal loss or vehicle reversals.

Doherty et al. utilized GIS to develop algorithms that detected trip routes by matching GPS points to the nearest link using a "buffering" technique, and identified trip-ends (or "activity" nodes) based on the clustering of GPS points, leading to over 90% accuracy without further by-hand processing. (See Doherty, S. T., N. Noël, M. Lee-Gosselin, C. Sirois, and M. Ueno. *Moving beyond observed outcomes: integrating Global Positioning Systems and interactive computer-based travel behaviour surveys*, In *Transportation Research Circular: Personal Travel: The Long and Short of It* (No. E-C026). Transportation Research Board, National Research Council, Washington, D.C., Washington, D.C., 2000, pp. 449-466.) When compared to self-reports, GPS has been shown to increase trip detection by 20-30%, especially for shorter more discretionary trips.

In most of these applications, GPS has been used largely to detect observed attributes of vehicular trips, including start, end times, routes, and trip ends. For example, U.S. Pat. No. 6,961,658 to Ohler discloses a vehicle navigation system that records information regarding trips regularly taken by a vehicle and populates a database with records of routine trip information. This trip information is then used to provide for the user traffic conditions associated with the routine trip route, among other things.

As a further example, U.S. Pat. No. 6,952,645 to Jones discloses a system for monitoring the travel of vehicles in response to requests from users in remote locations. The system comprises a data manager that records location data and vehicle information in response to requests, and then compares the data and information to determine whether the vehicle is a predetermined proximity from the location identified by the location data. The data manager transmits a message to the user if the vehicle is a predetermined proximity from the location.

However, in the context of emerging travel behaviour and activity-based approaches, these vehicle-focussed systems represent only a subset of the types of information commonly sought in diary-based surveys, albeit the most difficult for people to recall in most cases. Person-based GPS tracking holds the potential for extending the extent of detection to include trips by other modes (walk, bike, bus, train, etc.), and more complex activity patterns. Overall, GPS appears to offer unprecedented potential to improve the data quality and extent of travel surveys, and thus inherently reduces respondent burden.

As an alternative to GPS, Asakura and Hato showed how cellular phones can be used to track people at 2-minute intervals to within 20-150 meter accuracy. (See Asakura, Y. and E. Hato. Tracking survey for individual travel behaviour using mobile communication instruments. *Transportation Research Part C*, Vol. 12, No. 3-4, 2004, pp. 273-291.) Instead of satellites, location is estimated using the antennas of service providers located about every 100 meters in Osaka, Japan. In a test, Asakura and Hato use a basic "move or stay" rule to post-process such data to detect trips by start and end time, and demonstrate with examples how these compare to a trip diary for the same person. They conclude that such a system holds potential for monitoring travel behaviour in a real world environments, but that much further research is needed. In particular, they suggest further development of trip, mode and route detection algorithms based on statistical analysis of the observed location data rather than ad-hoc rules. They also suggest that future tracking surveys incorporate a cell-phone based questionnaire to capture undetectable trip attributes such as trip purpose.

In general, the growing emergence of location-enabled cellular phones is posing new opportunities and challenges for the development of Location-Based Services (LBS). For consumers, current LBS are largely limited to navigational or tracking systems that can display a persons' current location on a map and assist with way-finding or the identification of points-of-interest. These are widely available and, for example, include the recent SEEK & FIND™ and GOTRAX™ services offered by Bell Canada.

Despite all these key advances, it is largely recognized that GPS or any other tracking technologies will never provide for the ability to completely replicate a person's activity-travel patterns, nor capture all the typical elements included in activity-trip diaries. Well known signal outages, positional inaccuracies, cold-start issues, and other technical problems prevent 100% tracing. These problems are even more acute for person-based tracking, as people enter buildings/tunnels frequently and loose GPS or cellular signals or just get their body in the way of the antennae.

These problems were recognized in U.S. Pat. No. 6,898,518 to Padmanabhan, which teaches a non-automated method of identifying a human user's location by interpreting the user's visual cues, such as landmarks. Although an interesting approach, the method is limited because it relies on continuous user input and is therefore not capable of producing detailed and accurate location data that can be produced by a passive tracing means.

Even if the problems associated with automated tracing techniques are overcome through improved technologies, it is likely that no algorithm will ever be able to 100% detect all the complexities of the activities and trips made by people; e.g., multi-stop activities, short drop-off activities, and other random-like patterns are likely to remain difficult to detect automatically.

Perhaps more importantly, there are activity-trip diary elements that are difficult if not impossible to trace with GPS, including involved persons (unless perhaps, everyone was GPS traced), activity types (or trip purposes), and the underlying motives and decision processes that underlie observed patterns captured by diaries. This includes the Who, What, When, Why, and How, not just the Where—five additional elements that could vastly expand the value of such a system for a very wide variety of applications. What is a person doing? (Stationary activity, exercising, travelling, etc.) How did they get there? (By car, walk, bike, etc.) When and how long have they been doing it? With whom? Why are they doing it? (Shopping, working, routine, etc.) Even more valuable is the tracking and display of these answers for an entire day or week. Although the demand for this information has been ever increasing in the quest to better understand and forecast travel behaviour, there are few solutions aimed at processing person-based data to provide a more detailed accounting of a person's behaviour beyond just location.

However, some are going beyond the detection of observable patterns based on GPS, and have demonstrated potential for automated detection of attributes such as trip purpose as inferred from underlying land-use data and even underlying activity scheduling decisions such as activity-travel modifications and impulsive decisions. As a result, a hybrid class of location data supported diary surveys is emerging that combine passive tracing for the detection of a portion of peoples' activity-trip pattern, followed by an active and explicit attempt to prompt users to recall undetected elements and supplemental information. This hybrid design can be termed a "Prompted Recall" survey. Such surveys recognize that, rather than relying on time-consuming manual inspection and interpretation of GPS- or cellular-traced data to determine a person's activity-travel pattern (including interpreting gaps and detecting activities and trips), the real "experts" on the patterns is approached to do so: the persons themselves.

What is needed therefore is a method, system and computer program for monitoring human activity utilizing location data that overcomes the limitations and drawbacks of the prior art.

SUMMARY OF THE INVENTION

A method, system and computer program for detecting and displaying a person's activity-travel pattern over time and space is provided. In accordance with the present invention, the detection and display of a person's activity-travel pattern is accomplished by processing person-based geographic "location data" (for example, standard longitude and latitude geo-coordinates) sent from a personal communication device, the processing achieved using an activity detection means.

The method of the present invention comprises the steps of receiving person-based location data from a mobile device, compiling the person-based location data and processing the person-based location data using an activity detection means, the activity detection means generating a data output. In an embodiment, the method also includes displaying the data output to the user and receiving feedback from the user, wherein the feedback is dynamically used by the activity detection means.

According to an embodiment of the present invention, the activity detection means includes an activity detection algorithm that includes the steps of initially classifying the person-based location data according to either missing data point segments (L), activity segments (A) or trip segments (T), generating summary statistics for the L's, A's and T's, refining the L's, A's and T's, and detecting additional attributes.

The system of the present invention, in one embodiment, comprises one or more computers linked to a server computer, the server computer linked with a server application, the server application operable to provide instructions to the server to receive person-based location data from a mobile device, compile the person-based location data, and process the person-based location data using an activity detection means, the activity detection means generating a data output, and display the data output to the user, wherein the server application is operable on the server computer to receiving feedback from the one or more computers, and wherein the feedback is dynamically used by the activity detection means.

The system of the present invention, in another embodiment, can include a mobile application implemented on the mobile device, the mobile application being operable to carry out some or all of the processing steps in accordance with the activity detection means.

In another aspect of the present invention, the person-based location data is received from the mobile device at a frequency that is determined according to: (a) spatial-temporal circumstances as defined by parameters established by the user; and/or (b) the data output of the activity detection means, wherein a low frequency is achieved when a stationary event is sustained for a sleep minimum duration, and wherein a high frequency is achieved when a movement event is sustained for a wake minimum duration.

The computer program of the present invention, in one aspect thereof, is best understood as a computer application or computer applications that when loaded on a computer is operable to facilitate the method described above.

Advantageously, the present invention can be implemented on common hardware (e.g., cellular telephones, personal digital assistants, wireless handhelds, or portable computers with integrated GPS or Assisted-GPS), is fully automated (i.e. does not require manual processing of data), can adjust to varying degrees of input data accuracy and completeness, and is easily accessible via web-based interfaces and reporting, making various applications achievable at a relatively low cost.

BRIEF DESCRIPTION OF THE DRAWINGS

A detailed description of the preferred embodiments is provided herein below by way of example only and with reference to the following drawings, in which:

FIG. 6A and FIG. 6B illustrate a prompted recall diary interface for a simple home-work-home example; and FIG. 7A and FIG. 7B illustrate a prompted recall diary interface for a complex multi-tour example.

Figure 1:
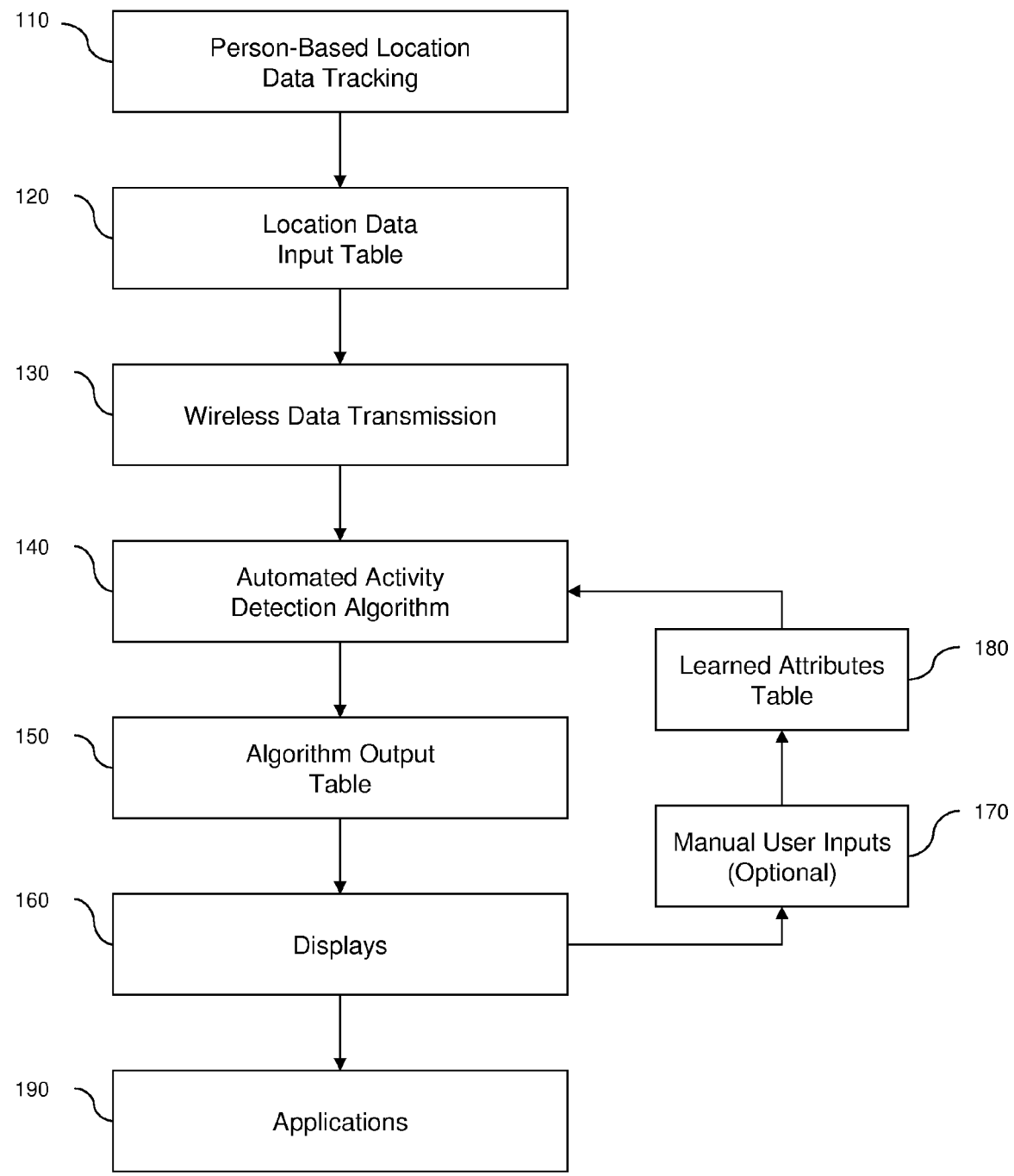
FIG. 1 illustrates a schematic of method steps in accordance with an embodiment of the present invention.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention relates to the frequent tracking and transmission of person-based geographical location data (e.g., longitude and latitude coordinates) to a computer server for storage and processing. An automated activity detection facility, which in a particular implementation is best understood as a computer implemented Activity Detection Algorithm (ADA), processes the data and provides predicted stationary activity and movement/trip segment information along with segment attributes (e.g., start/end times, building names, travel modes, etc.). This information can then be used as a basis for generating a variety of spatial, temporal and interpersonal displays of a persons data based on the algorithm's outputs, including temporal (either diary or calendar-type) and map-based displays for one or more persons. Such displays could be incorporated into a variety of applications, as described below.

The method of the present invention is best understood with reference to FIG. 1. Person-based location data tracking 110 is accomplished with a connected mobile personal communication device (or mobile device) operable to generate a persons' geographical point location data (the "where") at an optimal frequency, using one or more existing or future tracking technologies (e.g., GPS, assisted-GPS, GPS+accelerometer, cellular phone tower-based trilateration, etc.) capable of providing reasonable accuracy and frequency. Devices can be loaded with a software application capable of transmitting this data to a server, where the data is processed, as described herein.

Location data is then preferably provided to a location data input table 120. The location data consists of at least date/time information and longitude and latitude information, and preferably also speed information and measures of data quality/accuracy (such as GPS signal strength). Location data can be retrieved and compiled by any automated location technology capable of generating data at a relatively high frequency, including GPS or cellular-based location systems. For example, GPS data could be sent wirelessly every x seconds on a continuous basis, wherein x may vary from every 1 to 60 seconds. Preferably, the personal communication device is a cellular phone, a personal digital assistant, a wireless handheld, or a portable computer and the frequency is as high as possible, i.e. more frequent than every 60 seconds. Optionally, the frequency would be customizable so that it may vary in order to minimize power consumption (for instance, by adopting lower frequencies when a person is stationary and the highest frequency when they are moving), as discussed below. During the collection of data into the location data input table 120, it is expected that there will be some missing/poor quality data points.

Data from the location data input table 120 is provided to a server computer using wireless data transmission 130. The data is then processed in accordance with the ADA 140. Alternatively, it should be understood that in other embodiments of the present invention the personal communication device is operable to achieve some of the processing steps of the ADA 140, as discussed below.

Figure 3:
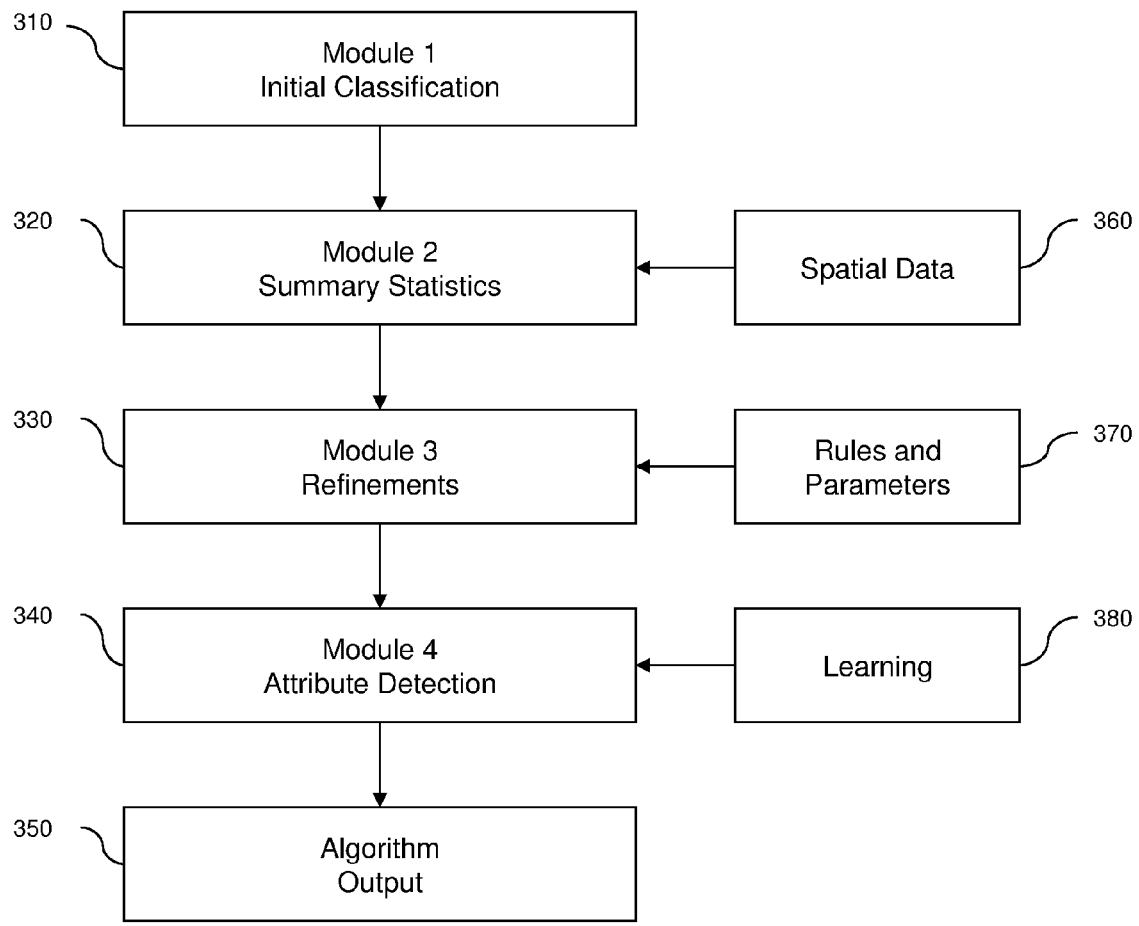
FIG. 3 illustrates a schematic of an algorithm in accordance with one aspect of the present invention.

The ADA 140 in an implementation of the present invention is in essence a set of modules that systematically reduces the raw location data into a sequence of stationary (activity) and moving (trip) episodes along with their attributes (when, where, what). This aspect of the present invention is illustrated in FIG. 3 and discussed below. Given inputted location data (the "where"), the algorithm outputs a listing of "when" and "what" characteristics, including the start and end times of short and long activities and trips, building entries, the location of activities (including building names and land-uses when related spatial data is optionally available), and travel modes (car, walk, jog, bike, bus, train, etc.). The present invention also contemplates the capacity to detect involved persons, indoor movements and stops, and to predict future patterns. The detection algorithm relies on a combination of logical and empirically derived rules, as well as "learning" principles customized to each person. Along with the location data, other spatial (e.g., road and land-use network maps) and historical information is optionally utilized by the algorithm to improve accuracy and detail.

Subsequent to processing by the ADA 140, an algorithm output table 150 preferably provides a listing of stationary (activity) episodes by, for example: what type (work, shop, at-home, etc.); when they occurred (start/end time, duration); where they occurred (in/outdoors, building name, land-use); and other attributes (nature of brief movement episodes). A listing of moving (trips/exercise) episodes is also provided by, for example: what type (walking, jogging, cycling, car trip, bus, subway . . . ); when they occurred (start/end time, duration); where they occurred (in/outdoors, path types); and other attributes (speed, distance, nature of brief stops).

Displays 160 are provided so that information can be conveyed to one or more users. For example, the displays 160 can be a web-based graphical user interface, including customizable spatial-temporal displays of the results such as time-diary, time-use summary, and maps. Depending on the application, this information may also be combined with other person-based streaming/tracked data, such as heart-rate, blood glucose, activity level (via accelerometer), air quality, noise levels, etc. Optionally, the displays 160 allow for manual user inputs 170 of information back to the ADA 140, allowing users to add new undetectable attributes to episodes, such as location names, detailed event types, etc. The manual user inputs 170 thereby preferably contribute to a learned attributes table 180, comprising particular information, e.g., locations (work, home), episode and location combinations, travel mode profiles, speed profiles, etc., that is considered by the ADA 140. Learned attributes are discussed more fully below.

The processing of location data in this manner can be directed or tailored to one or more particular applications 190, including, for example, a prompted recall diary data collection system, a lifestyle diary for medical patients, a health and safety monitoring system, and an enhanced location-based service with more detailed tracking and reporting features.

Figure 2:
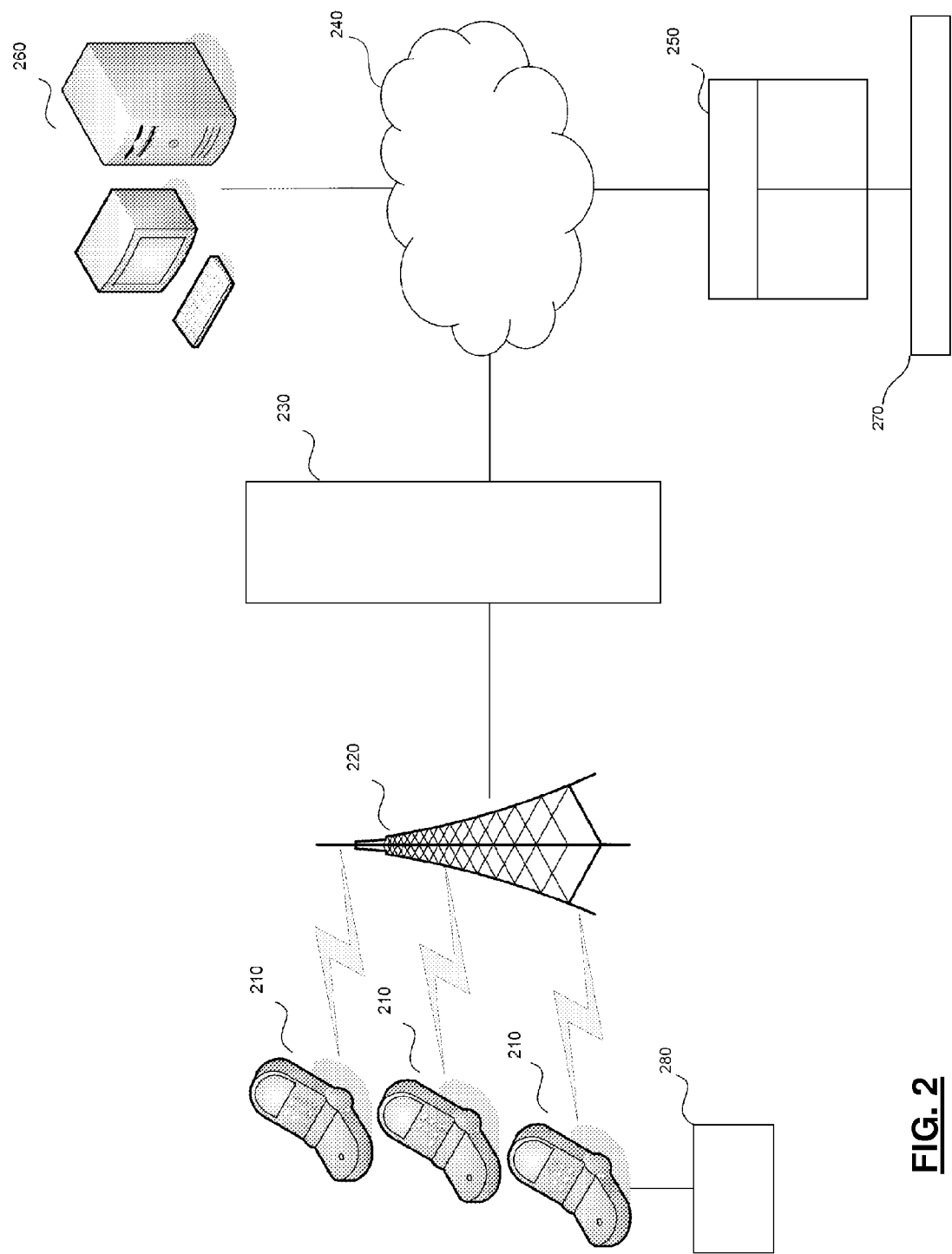
FIG. 2 illustrates a schematic of a system in accordance with an embodiment of the present invention.

The system of the present invention, in one embodiment, is best illustrated with reference to FIG. 2. In this case, the system comprises one or more computers 260 linked to a server computer 250 through the Internet 240, the server computer 250 being linked with a server application 270, the server application 270 operable to provide instructions to the server computer 250 to receive person-based location data from a mobile device 210, the person-based location data being sent from a user through a network 220 by way of a wireless gateway 230 connected to the Internet 240. The server application 270 is further operable to provide instructions to the server computer 250 to compile the person-based location data, process the person-based location data using an activity detection algorithm, the activity detection algorithm generating a data output, and display the data output to the user, wherein the server application 270 is operable on the server computer 250 to receive feedback from the one or more computers 260, and wherein the feedback is dynamically used by the activity detection algorithm.

There are embodiments of the system of the present invention that require more/less distributed data processing on the server computer 250 versus on the hand-held device 210. Generally, the hand-held device 210 will at least process the incoming location information with respect to frequency and variables obtained (longitude, latitude, speed, etc.) and data format (including data compression if implemented). Distributing data processing to the server computer 250 is desirable when: (a) the processing power of the hand-held device 210 is limited; (b) large transport/land-use spatial data files are to be utilized by the ADA.

However, for certain applications (such as disabling hand-held devices depending on what the user is doing and the frequency optimization applications, as discussed herein) a subset of the algorithm sufficient for this particular application could be fully implemented on the hand-held device 210 via a mobile application 280, assuming sufficient processing and data storage capabilities of the hand-held device 210. This would have the advantage of avoiding data transfer, potentially faster results, and easier integration within other hand-held-based applications. Note that regardless of where processing occurs, transfer of the results to the server computer 250 for further display/analysis and logging purposes, is still a key aspect of many applications.

Further illustration of aspects of the present invention is provided with the discussion of the ADA below.

Activity Detection Algorithm

The ADA is best understood with reference to FIG. 3, and is preferably implemented as a computer program in a manner that is known.

The ADA is broken down into modules (1, 2, . . . ), cases (1, 2, . . . ) and sub-cases (a, b, . . . ) that run in sequence (a particular implementation involves staggered parallel processing of modules to achieve greater efficiency and run speeds), each of which is described in depth below. It should be understood that the ADA can be implemented to hardware, in a manner that is known, and that the modular structure for a representative software implementation of the ADA described below is provided merely to illustrate the functions and operation of the ADA, and numerous other computer implementations of the ADA are possible, including but not limited to the integration of the ADA with third party hardware and software.

Module 1 310—Initial Classification of Each Location Data Point

The first pass through the raw Location Data Input Table 120 is meant to provide an initial classification of each location point as follows:

L: Missing data point (speed and/or coordinates missing, or deemed unreliable);
A: Stationary activity/stop/pause (Speed<x);
T: Trip/movement (Speed≥x);

where x: an estimated parameter close to zero; and
Speed: as given by the device, or as calculated.

The result is that a long series of contiguous points will then share the same coding. These are defined as L, A, and T "segments", "series" or "episodes" that have a start and end time. At this initial stage, an overly large number of these are generally produced, owing to frequent short stops during trips (e.g., traffic lights, delays), movements during activities (e.g., room to room in a building, signal scatter) and short/long signal losses (e.g., buildings, tunnels, cold starts, equipment failure) occurring in reality. The next stage in the algorithm is thus to further refine, join and convert these in order to arrive at a more true representation of a person's A's and T.

Module 2 320—Summary Statistics for each L, A, T Segment

Spatial data 360 is provided to the ADA. Whereas point speed alone was sufficient in the initial coding in Module 1 310, many additional spatial-temporal explanatory variables are required to define and fine-tune the segment results via the rules and procedures outlined in the sections to follow. They include the following:

For all L, A, and T segments:
a) Time statistics: start, end, duration of each L, A, and T segment.

For all A segments:
b) Spatial mean: of all points belong to each A segment.
c) Proximity statistics*: distance if spatial mean to closest building footprint, intersection point (by type), transit stop point (by type), and pathway (by type), given available transport network and land-use spatial data.
d) Signal quality statistics*: % points of poor quality, average signal/noise ratio, # gaps.
e) Heading statistics: degree of heading change from approach to exit from A (for purposes of detecting "turn-around" points).
f) Within-Activity Movement ($A_m$'s) statistics (A's only): #, avg duration, avg speed, etc.

For all T segments:
g) Speed statistics: average, standard deviation, max, etc.
h) Acceleration statistics: average, standard deviation, max, etc.
i) Distance statistics: actual, straight line.
j) Proximity statistics*: % points within x meters of building footprints, % of points within y meters of previous/following A, % points within x meters of pathway.
k) Signal quality statistics*: % missing points, # of missing point segments (gaps), etc.
l) Heading statistics: degree of heading change from beginning to end of trip, sd/variability in heading (for purposes of detecting "round trips", serendipitous routes indicative of leisurely walks, jogging, and other exercise, or within-building movements).
m) Within-Trip Stop ($T_s$'s and $T_d$'s) statistics (T's only): number, average duration.

For all L segments:
n) Signal quality statistics: Loss type (complete loss, missing coordinates/speed, deemed unreliable via Module 1 310), average signal/noise ratio*, average number of satellites*, etc.
o) Distance statistics: estimated straight-line distance between last known start coordinates and end coordinates
p) Speed statistics: estimated speed of movement between last known start coordinates and end coordinates.
q) Spatial mean: of all available points (if any) belonging to each L segment.

Items marked with an asterix (*) are considered optional, but preferred variables that allow the algorithm an increased level of precision. However, some current and future location tracking devices (e.g. some embedded a GPS in cellular phones) may not provide certain variables (e.g., speed, signal quality), or enough data to estimate them (speed can be estimated if frequency is high enough), and in some urban areas, spatial data on the transport network and/or buildings and/or land-uses may not be available or in usable form. The algorithm is adjustable to account for these situations. The present embodiment assumes location data equivalent to or better than existing person-based GPS technologies (that does provide all the above variables), and urban areas that have transport network and land-use data available (all large Canadian, U.S., and European cities have such data available, such as DMTI™, and NAVTEQ™, similar to what is widely used by on-line mapping sites such as GOOGLE™ maps or MAPQUEST™).

Module 3 330—Refining Initial L, A, and T's

The large number of Loss (L), Activity/stop (A), and Trips/movement (T) segments produced in the proceeding module 330 must be refined via conversions and joins to produce a reduced and more accurate segmentation of actual activities and trips. A novel series of transformations are included in the algorithm, each of which require transformation rules and parameters 370 (indicated by x, y, and z's). The rules and parameters 370 are based on extensive empirical analysis of real-world input data (i.e. person-based tracked GPS data) combined with tracking of true outcomes, and are meant to optimize the accuracy of the algorithm. Several example rules and parameters 370 are listed below.

Module 3A—Converting L's to A's and T's

Case 1: T→L→T Converted to {T→A→T} or {T}

This relates to short signal losses en-route result from tunnels (e.g., bridges, subways), urban canyons (tall buildings), canopies (e.g., trees), etc. These are converted as follows:

a) Very short L's are simply converted to T's (Rule: L duration<x seconds).
b) Longer L's that span a logical length and speed (i.e. lost signal, but picked it up again a reasonable distance away given time and speed) are also merged to a single T.
c) Longer L's that could potentially have contained a stationary stop are converted to an A (recognizing that even though no A's were initially coded, the long loss likely resulted from stopping suddenly in a location before speeds dropped); however, if the distance between T's is large enough, the end time of the new A and start time of the second T is shifted back in time.
d) Otherwise, L remains as unknown time period.

Case 2: A→L→A Converted to {A→T→A} or {A}

Similar to above, short and long periods of signal loss often occurs in buildings.

a) When the A's are within close proximity of each other (Rule: A spatial means are within x meters of each other) the A's and L are merged into a single A. The y is quite large to allow long periods spent in certain activities (e.g., work, at-home).
b) If the two A's are greater than x meters apart and the L spans a logical length and speed of movement, it is fully converted to a T.
c) If the two A's are greater than x meters apart and the L spans does not span a logical length and speed of movement then the second A start and new T end time are shifted back in time.
d) Otherwise, L remains as unknown time period.

Case 3: T→A→L→A Converted to T→A

Signal losses will occur occasional between Trips and Activities, such as on entry to a parking garage. Logic similar to the above is used to split the L into T and A portions.

Case 4: A→L→T Converted to A→T

Signal losses will occur frequently at the end of activities owing to building entries and "cold starts" (location technologies such as GPS often need a warm-up period of 10-90 seconds). Logic similar to above is used to split the L into T and A portions.

Module 3B—Converting and Joining Intervening T's and A's

Case 1: A→T→A Converted to {A→T→A} or {A}

Long duration A's within close proximity of each other may be broken up by a variety of short movements people often make during activities (e.g., room-to-room movements, active activities).

a) Very short movements are converted to A and joined into a single A.
b) Short/medium movements within the same building footprint (Rule: Proportion of trip points within building footprints>x %) or within close proximity of the A's are also considered part of the A (not a Trip) and are joined together in a single A, but flagged and retained as an attribute of the A ($A_m$: in-building or part-of-activity movement episodes).
c) Medium/long trips outside these rules remain as detected T's.

Case 2: T→A→T Converted to {T→A→T} or {T}

Similar to above, long duration T's may be broken up by brief A's owing to short stops en-route (traffic stops, congestion, and pauses in vehicle), brief drop-off/pick-up events (e.g., drop kids at school), or mode-switch points (public transit stops/stations, parking locations, or other known mode switch points). Detecting these requires consideration of additional variables beyond duration, including close proximity to certain attributes and route heading changes, as follows:

a) If the A is short/medium in duration and appears to be a drop-off/pick-up (Rule: A heading change>x degrees), then it is retained as an A with attribute "Drop-off/Pick-up". (These are some of the most difficult events to detect, often requiring time-consuming calculations; they are thus considered advantageous options not needed for all applications.)
b) If the A is short/medium in duration and significant change in speed occurs (Rule based on statistical test of significance) then it is retained as an A with attribute "Mode Switch". If also, it appears to be near a transit-mode-switch point (Rule: Nearest transit stop<z meters) then it is retained as an A with attribute "Transit Mode Switch".
c) Very short A's (Rule: A duration<x exclusive of a) and b) above are ignored and merged into a single T.
d) Short/medium A's exclusive of a) and b) above, that are close to intersections or roadways are considered stops en-route ($T_s$,) or delay episodes ($T_d$) by the same mode and are merged into a single T, but flagged and retained as attributes of the T.

e) Medium/long A's outside these rules remain as detected A's.

Meta Rules for Controlling Module Flow Sequence

Additional "Meta" rules control which of the above rules are run first and the selection of L, A and T sequences to deal with. For the most part, the rules run in the sequence as above, wherein L's are first dealt with and converted to A's and T's accordingly, followed by dealing with intervening A's and T's, then special cases. The order will vary in certain cases depending on the duration of A's and T's, since longer duration ones will tend to take place first owing to the sensitivity of the rules to duration.

Settings

A settings table exists to allow customization the various parameter values (i.e. all the x_, y_, z_, xx_, . . . ) for different applications, and to set such things as input data type, available spatial data, etc. These latter settings would be used to select amongst alternative rules for the same module/case/sub-case, recognizing that missing information (such as signal quality; transit stops), will required less elaborate rules.

Events Output Table

The large number of L, A, and T segments produced in Module 1 310 will be substantially reduced after Module 3 330 to a more accurate listing of true daily events:

A: Episodes of stationary outdoor or in-building Activities with minimal significant movement.

$A_m$: Movement episodes within an A.

T: Episodes of Travel (Trips) between successive activities.

$T_s$: Stop episodes enroute within a T.

$T_d$: Episodes of delay enroute within a T.

L: Remaining, typically long, periods of unknown behaviour (largely due to equipment failures beyond control of algorithm.

All the summary statistics outlined in Module 2 320 are recalculated (if needed) for each A and T episode (including for new $A_m$, $T_s$, and $T_d$'s), and linked to this table.

Module 4 340—Additional Attribute Detection

Activities (A's):

To this point, the following attributes of Activities are detected:

Start/end time, duration;
Location coordinates (spatial mean);
Within activity movement episodes;
Whether it is a brief pick-up/drop-off point; and/or
Whether it is a brief mode-switch point (including specific transit mode-switches).

To this, a range of additional preferred attributes are estimated using a variety of rules and functions in a probabilistic fashion in most cases (as in, 90% probability activity was in-doors). These include the following cases:

a) P(In-building, outdoors)=$f$\{proximity to known building footprints, signal quality, Within-Activity Movement\} where P is a probability, and the $f$ is a function normally taking the form of a decision tree or discrete choice model, and the variables are as calculated/defined above.

b) Building name rule: if P(in-building)>x and [building has a name] then select name.

c) Land-use rule: if P(in-building)<x and P(outdoors)>x and [Land-use has a classification] then select Land-use.

In the absence of needed summary statistics/variables, the above are not calculated. In some cases, two or more functional forms are estimated with varying numbers of variables, so that in absence of particular variables, an alternate estimate can be made based on remaining available variables (although probabilities/accuracy is likely to go down as a result).

Trips (T's):

To this point, the following Trip attributes are detected:
Start/end time, duration;
Speed/distance statistics; and/or
Within trip stop episodes ($T_s$, $T_d$).

Similar to above, the following additional attributes are estimated in the following cases:

a) Travel Mode Detection: P(walk, bicycle, personal automobile, bus, subway, streetcar, train, etc.)=$f$\{speed statistics, distance, proximity statistics, within-in trip stop statistics, signal quality\} where P is a probability, and the $f$ is a function normally taking the form of a decision tree or discrete choice model, and the variables are as calculated/defined above.

b) Leisure Travel/Exercise Detection: P(leisure walk, leisure bicycle tour, jogging, etc.)=$f$\{speed statistics, distance, heading change, proximity statistics, and within-in trip stop statistics\} where P is a probability, and the $f$ is a function normally taking the form of a decision tree or discrete choice model, and the variables are as calculated/defined above.

c) Route: although not part of the present embodiment, detection of transport network links/roadways/paths that make up the actual route is a future possibility.

Learned Attributes 380

A wide range of Learned Attributes 380 may be optionally linked to Module 4 340 detected events based on historically tracked patterns, and interactivity with the person to manually acquire additional attributes. The latter requires some form of "Prompted Recall" diary or display to elicit further information from users.

In an embodiment of the present invention, users are shown a time-sequential table listing of automatically detected events in the form of an on-line diary, showing the start/end times, event type (what is known so far), and location (what is known so far) in tabular form (i.e. columns for each; although other displays are possible). An interactive map is optionally available to view locations. Under this approach, users can click on existing attributes to update them with more information, such as providing more specifics on event types (Activity-Working) or building names when they are not known. Additional tabs/columns could also be added querying for other event attribute, such as involved persons, planning required, satisfaction, stress, pain experienced, health status, etc.

Logging this data provides a historical database that can be drawn upon to estimate unknown attributes on future days. The most direct way is when a location is revisited (as in Module 3A Case 2 above, and others), in which case, the building name (e.g., XYZ Inc.), specific event type (e.g., working, at-home), and other attributes can be assumed to be the same as the previous event or selected probabilistically from a set of past values. For trips, a similar procedure could be used to assist in selecting travel mode or in fine-tuning user-specific parameters to increase detection accuracy.

Algorithm Output 350—Events and Attributes Table

In summary, the algorithm outputs a table with a daily events listing and their attributes, for example as follows:

Events Types: A, $A_m$, T, $T_s$, $T_d$, L.

Activity Event Attributes: start time, end time, duration, location coordinates, indoor/outdoor classification, nature of brief stop if applicable (drop-off-pick-up, mode-switch point), within activity movement episodes, building/location name*, land-use name*, activity type*, other learned attributes.

Trip Event Attributes: start time, end time, duration, speed/distance statistics, within trip stop episodes (Ts, Tc), travel mode, leisure travel/exercise detection, route*.

Items marked with an asterix (*) are considered optional, assuming sufficient transport/land-use spatial information is available or if learned historical information has been obtained through prompted recall.

Estimating Parameters

As can be seen in above, the accuracy and the algorithm rests in the novel structure and combination of rules, and especially their parameter values. To achieve maximum fit, real-world input data (i.e. person-based tracked GPS data) combined with tracking of true outcomes is used to explore logic/structure and empirically calibrate parameters.

Power Optimization

The ADA could be used to make a secondary device or service behave differently based on what the person is currently "doing", as automatically determined by the ADA.

One clear example is the case of handheld cellular phones, hand-held computers, smart-phones, or RIM BLACKBERRY™, which could be designed or configured to be automatically disabled (or an automated response sent) in a specific subset of spatial-temporal circumstances as detected by the algorithm, such as when driving an automobile (but not when walking), after being at home for more than an hour, when out-of-town on weekends, etc. The exact settings and their parameters would be up to the user, but once set, would be automatically detected/implemented. This would represent an automated way to reduce the "addiction" some people feel to such devices (especially after working hours), improve safety, improve communication (especially if sender can be automatically notified of circumstances of receiver), and enhance work-life-balance.

Another related example of such an application is the case of using algorithm outputs to control the frequency with which the geo-coordinate location (e.g., from GPS) is tracked and stored, for purposes of reducing power consumption, data storage, data transmission, and data processing costs/time. In this case, algorithm outputs with respect to onset and duration of movement and stationary events would be used to set/change the frequency of location acquisition from high (e.g., every 1-10 seconds) to low (e.g., every 1 or more minutes). This frequency would be set to low once a stationary event is sustained for a minimum duration (e.g., after 5 minutes of stationary activity), and increased to a higher frequency at the onset of movement events. These could be considered "sleep" and "wake" modes, wherein continued low frequency location requisitions during sleep would be used as "pings" to control waking up to higher frequency mode. The exact high frequency value would depend on the subsequent application of the data—wherein higher frequencies allow more accurate assessment of algorithm-derived event attributes, such as speeds, acceleration, mode type, route, etc. The exact low frequency would depend upon the accuracy to which stationary end times and movement start times are desired. But even if the highest frequency was chosen for movements (e.g., every second), a substantial savings in power and data storage/transmission/processing costs would accrue owing to the substantial portion of time that a user typically remains stationary.

Accelerometer

As mentioned above, an accelerometer may be optionally included to derive additional person-based data inputs. An accelerometer can generally provide an indication of a user's activity level, i.e. it is operable to determine whether a person is busy or still, e.g., if they are exercising or not.

Advantageously, an accelerometer (either embedded in the mobile device or otherwise connected, e.g. via BLUETOOTH™) could used as an additional source of data when the GPS signal is lost. In this regard, an accelerometer could serve as an additional input to the ADA that could improve its predictive power and detail.

Applications

According to one particular implementation of the present invention, the server application 270 and the server computer 250 are controlled by a telephone company, for example, and the information generated by the ADA is logged and displayed to a user after secure login via one or more computers 260 connected to the Internet 240. The user may be, for example, a person interested in one or more aspects of their daily behaviour (e.g., time use summary, travel distances, amounts of exercise, etc.), a doctor/nurse interested in monitoring if a patient is adhering to a prescribed daily lifestyle change (e.g., more outdoor exercise), or a parent interested in their child's behaviour.

According to another implementation of the present invention, the information generated by the ADA may be used to customize or enhance a supplemental or related service—such as delivery of a package, information or other consumer application—under certain spatial-temporal conditions or constraints (e.g., not working or driving) for which the algorithm generates parameters for.

Activity-Travel Diary Data Collection System

In one embodiment, the present invention was implemented as an on-line personal activity-travel diary data collection system that could potentially replace existing diary data collection performed by government agencies around the world. This application has been termed a "Prompted Recall Diary". An experimental study to demonstrate the potential of utilizing person-based passive GPS tracking equipment was conducted in 2005. (See Doherty, S. T., Papinski, D., and Lee-Gosselin, M. 2006. *An Internet-based Prompted Recall Diary with Automated GPS Activity-trip Detection: System Design*. Presented at the 85th Annual Meeting of the Transportation Research Board, Jan. 22-26, 2006.)

The equipment for this study consisted of four main components assembled in small shoulder pack worn by subjects, including: (1) cellular phone (BLUETOOTH™ enabled, SYMBIAN™ OS, 208×320 display, 48 MB storage capacity, sized 115×57×24 mm, weighing 150 grams); (2) lightweight GPS receiver (BLUETOOTH™ enabled, 12 channel receiver, built in antennae, sized 77.9×56.9×22.8 mm, weighing 70 grams); (3) external booster antenna (water resistant, sized 30×25×8 mm, cable 196 cm); and (4) supplemental battery (custom made, 2 USB power outlets, rechargeable 6 cell battery sized 38×70×56 mm, battery sled sized 20×87×44 mm, total weight 329 grams).

The shoulder pack was assembled such that the small booster antenna is located on the shoulder strap so as to have a clearer view of the sky when worn. The battery and GPS receiver are placed within the pack, whereas the cell phone is placed in its own pocket on the shoulder pack sleeve for ease of use. For this study, users did not interact with the phone, although it is possible to complete the prompted recall diary using an Internet browser on the phone.

The GPS receiver was setup to wirelessly broadcast various GPS sentences in the NMEA (National Marine Electronics Association) 0183 standard, at one second intervals. Among other fields, this sentence includes the date, time, latitude, longitude, speed, and satellite strength. A custom-made JAVA™ program was designed for the cell phone to receive, compress, and then send this data wirelessly to a central server for storage and further processing. Data transmission from the cell phone was via GPRS (General Packet Radio Service). A full day of one-second interval compressed GPS data ranged in size from 1.2 to 1.7 MB.

The first step in the prompted recall diary was to process the GPS data to automatically detect the following activity-travel pattern attributes in accordance with the present invention: event type (activity, trip, unknown gap); event start/end times; trip modes (auto, walk, bike, bus); activity location geo-code (longitude and latitude); and land-use classifications in vicinity of activity location (residential, commercial, etc.).

The algorithm, as described herein, was computer-implemented and setup to automatically run late-night, processing data from the previous day with no human intervention. At first, the algorithm took an average of 214 seconds to process a single day, but a fundamental shift in the way spatial data was processed resulted in a reduction to 30 seconds.

The next step in the survey process was to display the automatically detected attributes in a tabular diary-style display. Example data is displayed as it would appear prior to any user inputs. The date and ability to scroll to other days was provided at the top of the diary. Events were listed horizontally in sequence by time, event type, location, and "other" attributes (e.g., involved persons). Color was used to provide a natural means to convey which event attributes require attention, wherein red indicates wholly unknown attributes, yellow indicates attributes that require confirmation or updating with more detail, and green indicates attributes that are confirmed and completed. Additionally, white gaps indicated periods that were undetermined.

Users were instructed as follows: (1) click on any yellow attributes to modify if incorrect, or update with more detail (in the case of event types and locations); (2) specify any missing red items (such as involved persons); (3) fill in gaps with one or more new events; and (4) delete wholly incorrect events, but only after trying to modify first. They were instructed to do this until everything has turned green and there are no gaps in their day. Specifying event attributes (time, event type, location, involved persons) involved clicking the attribute on the main diary screen, bringing the user to a new page for each attribute. When finished specifying the attribute, users clicked "Save" and were returned to the main screen. This approach was essential to providing enough space to specify the attribute as many attributes involved pulldown lists or radio buttons to speed entry, options to specify "new" items, and even an interactive map in the case of locations. All this cannot be accommodated on the main screen, nor is this desirable from an aesthetic perspective. The design is such that only an amended description of key attributes are displayed on the main screen sufficient for the event to be easily distinguished by the user—namely the start/end time, event type and location name. This retains the compactness of the display. Involved persons are not even shown, and are instead represented by a single icon in the "other" column (the happy face) that serves as a reminder to click on and specify them. Any additional attributes, such as travel costs or when the event was planned, would be similarly displayed with an icon in the "other" column on the main screen.

Overall, this PR system was designed to automatically detect seven attributes (activity events, trip events, event start, event end, trip mode, activity location geo-codes, and location land-use classification) and prompt for four additional attributes not currently detected by the algorithm (activity specific type, activity-involved persons, trip passengers, location-unique labels). The approach of using a tabular-diary combined with specific attribute pages, allowed for a highly compact display in "calendar/schedule" style that is likely familiar to many people. The computer seamlessly managed the flow of queries without need for complex redirects commonly needed paper-and-pencil surveys. Note also that Help pages were provided throughout, including on the main screen and for each attribute screen. This allowed instructions to be provided specifically where and when needed, rather than having to provide a comprehensive manual that can be cumbersome if not overwhelming for users in paper-and-pencil surveys. An options menu was also available where users could edit their lists of locations, people and events.

Although the main interface was tabular, users did have the option to view (but not interact with) their daily diary in spatial form. Activities were depicted as red circles, and trips as straight red lines with chevrons indicating direction of travel. A straightline approach to trips was adopted not only to simplify the map, but to avoid frequent cases where trip routes disappear due to signal loss, which can be handled by the algorithm logic, but could make map interpretation difficult for the user. There was an option to display labels at activity locations indicating their start/end time and the activity type. Displaying labels sometimes resulted in a cluttered display with labels that overlapped and obscured other information—one indicator of the difficulty in designing a spatial PR survey.

Figure 4:
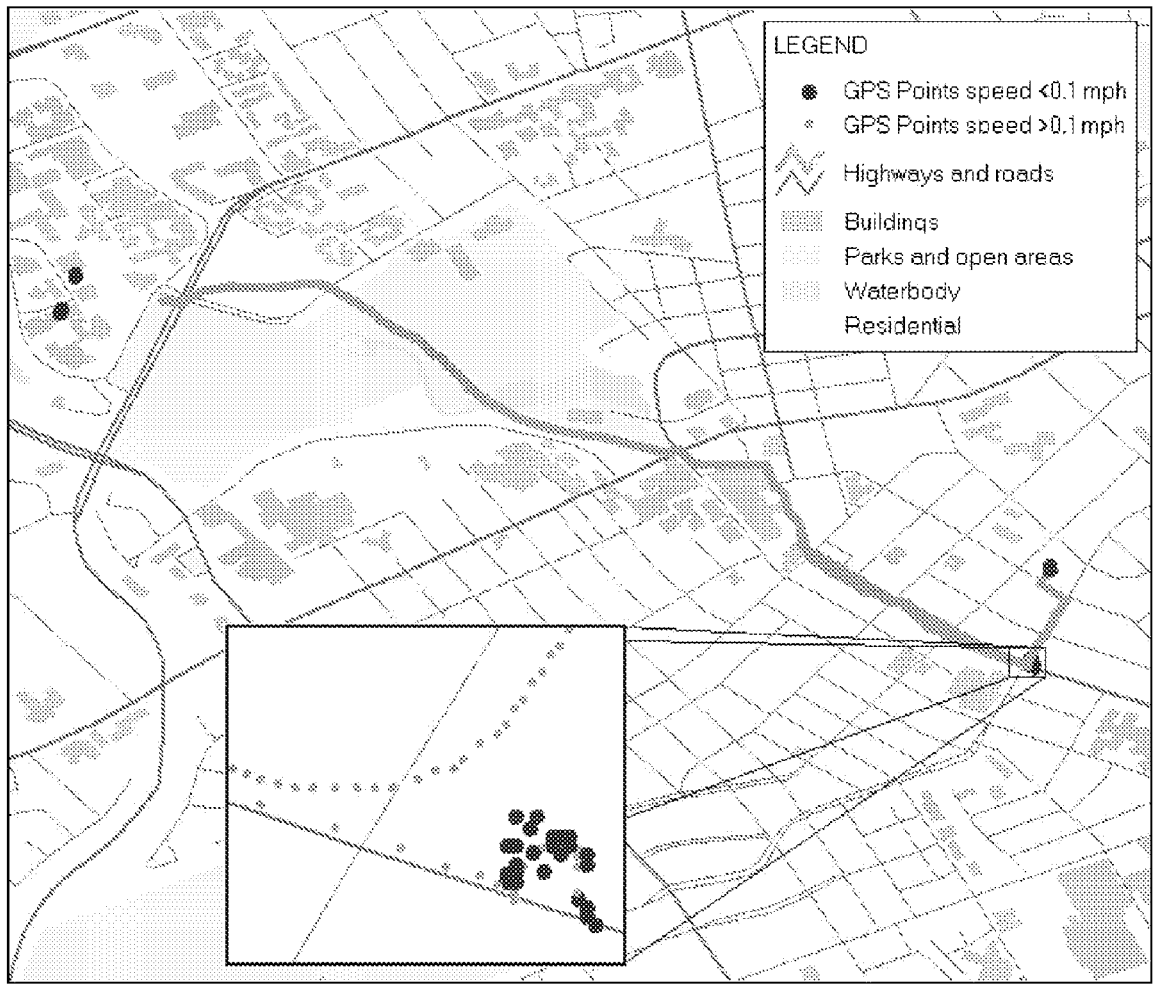
FIG. 4 illustrates person-based raw GPS traces for a simple home-work-home example.
Figure 5:
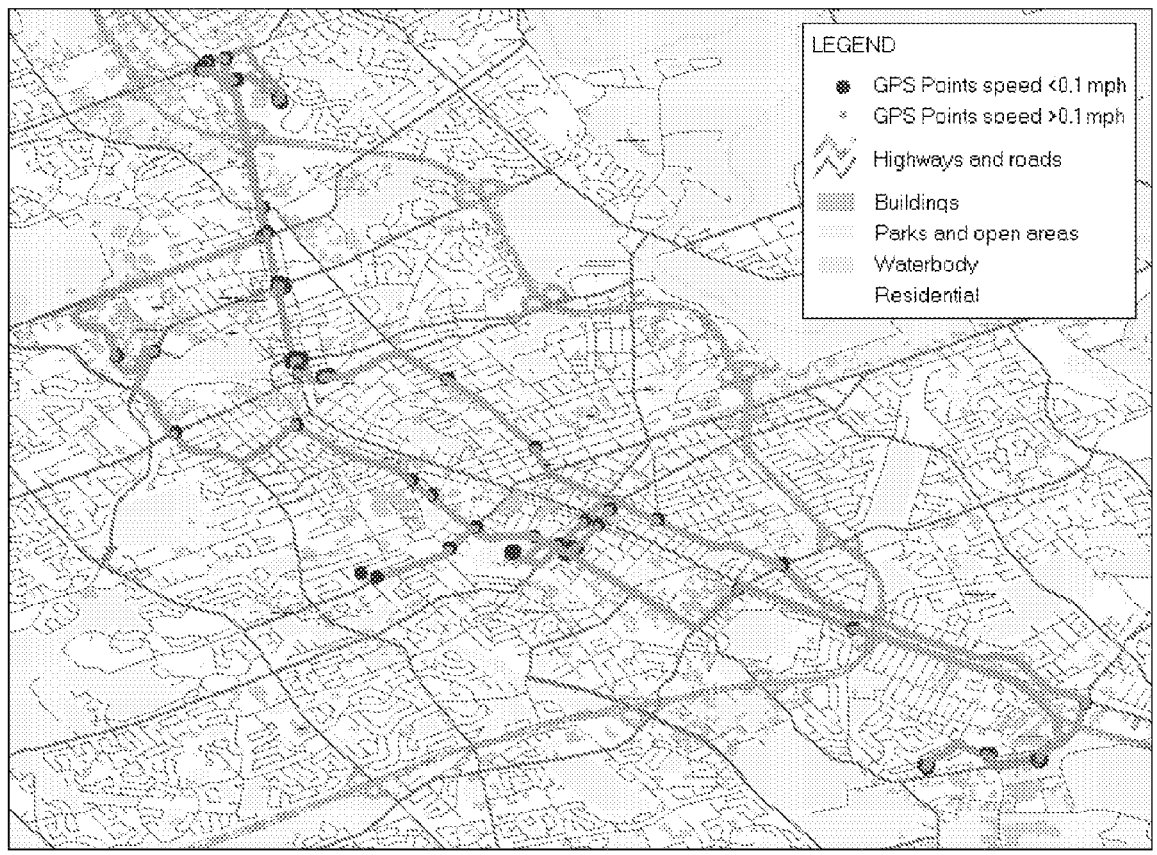
FIG. 5 illustrates person-based raw GPS traces for a complex multi-tour example.

Two example sets of data are shown graphically to illustrate the functioning of the PR system. The first, FIG. 4, is a simple home-work-home pattern of a full-time employed person, whereas the second, FIG. 5, is a more complex multi-tour pattern of a full-time student. Subjects were instructed to carry the GPS tracking pack everywhere they went, but otherwise did not interact with it. In FIG. 4 and FIG. 5, the very obvious travel routes should be noted, as well as clusters of points where activities are conducted. It should also be noted that the signal is occasionally lost along the route (see far left of FIG. 4, when user entered a tunnel) and at destinations (although this is difficult to see at the resolution of FIG. 4 and FIG. 5). Note also that, by nature, the travel routes do not always stick to roadways, as when the subject in FIG. 4 walked through a park.

FIG. 6A and FIG. 6B show an on-line prompted recall diary main interface for a simple home-work-home example, with FIG. 6A showing initial results of event detection algorithm and FIG. 6B showing a completed diary after filling the gaps, confirming all attributes, updating location/activity labels, and adding involved persons/passengers. This tabular diary-style display format preferably provides for color-coded event attributes, as described above.

Figures 7A, 7B:
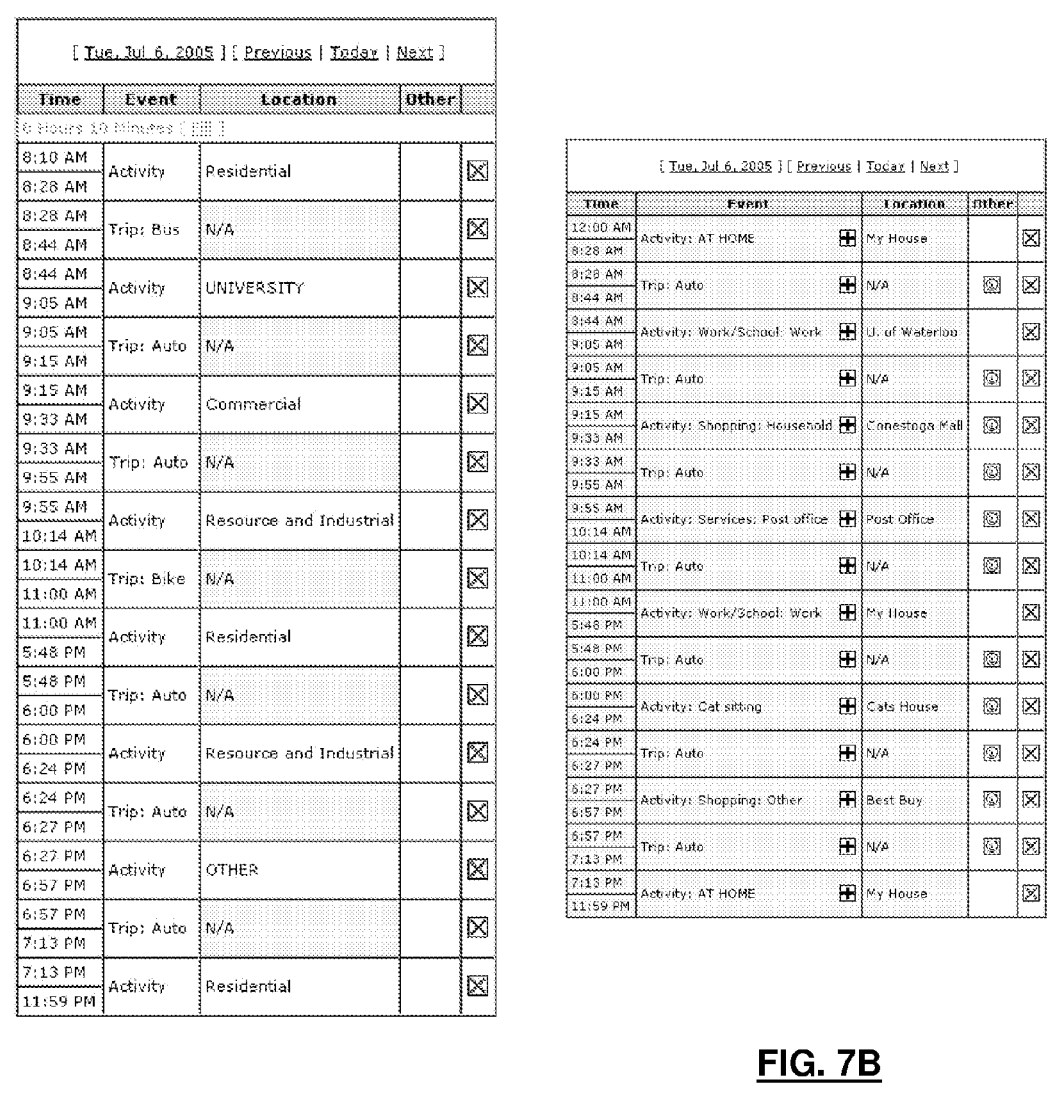

Similarly, FIG. 7A and FIG. 7B shown an on-line prompted recall diary main interface for a complex multi-tour example, with FIG. 7A showing initial results of event detection algorithm, and FIG. 7B showing a completed diary after filling gaps, confirming all attributes, updating location/activity labels, and adding involved persons/passengers.

The results of the GPS algorithm prior to any user inputs is shown in tabular form in FIG. 6A and FIG. 7A. In the simple home-work-home example, the algorithm had trouble dealing with the multi-mode trip to work in the morning (walk-bus-walk). The algorithm correctly detected a walk trip, but interpreted the wait time at the bus stop as a "residential" activity, followed by another walk trip. In addition, likely due to signal loss, the algorithm did not completely detect all the hours spent in the home at the beginning and of the day, resulting in gaps. As a result, of the 41 attributes of the 3 activities and 4 trip segments, 26 were correctly detected automatically. Users had to make 5 changes to detected attributes, and 10 updates of new attributes, to arrive at their final diary. If the attributes that the algorithm does not currently even attempt to detect were ignored (i.e. activity specific type, activity involve persons, trip passengers, and location unique labels), then 26 of 31 attributes were correctly detected.

The more complex multi-tour example included 8 activities and 7 auto trips, in two tours. All activities and trips were correctly identified, but the mode was incorrect in two cases, and the start time of the first event was incorrect (and thus a gap was evident before it). There were no incorrectly identified events that the user did not do. Four of the land-use classifications of locations also did not match the eventual imputed location/event type, although users do not update this information (it is used only as an initial indicator of the location—users supply a unique label of their own to replace it). Overall, of the 95 attributes, 61 were correctly detected automatically. Users had to make 7 changes to detected attributes, and 23 updates of new attributes, to arrive at their final diary. Again, ignoring the attributes that the algorithm does not currently even attempt to detect, then 61 of 68 attributes were correctly detected.

Taken together, the person-based GPS tracking and automated algorithm appear to have correctly detected about ⅔ of the attributes that would be included in a detailed activity diary. Of the attributes that it was capable of detecting, it got almost 90% correct.

More recently, a system in accordance with the present invention has been deployed on a RIM (Research in Motion) BLACKBERRY™ smartphone with integrated GPS and extended battery. This avoids the need for external power and antennae, makes for a more compact tracking device, and more closely matches emerging GPS-smartphone capabilities in the marketplace. The JAVA™ program for controlling data flow (receipt, compression, and wirelessly transmission to a central server for storage and further processing) was adjusted/modified for this type of device. A Blackberry Enterprise Server (BES) was setup to assist with data transmission and improve data security. This new system is currently being deployed as part of a study of Diabetic patients. (See Doherty, S. T. and Oh, O. 2006. *An Automated Monitoring System of Patients' Daily Life and Physiological Conditions*. Poster presented at Connected Health—Empowering Care Through Communications Technologies, Harvard Medical School, Boston, Mass., September 18-19).

Health and Safety

In terms of other health and safety applications, the present invention could greatly improve delivery of routine or emergency health services. The most obvious benefit is in the tracking of vulnerable people or patients in order to detect erratic/unsafe behaviours or situations, such as lost children or patients have become immobile. Whilst some currently available services offer this potential, knowing the recent history of a patient could significantly enhance proper response—such as knowing what activity they were recently participating in, who with, or the building they are located in.

In terms of other health and safety applications, the present invention could greatly improve delivery of routine or emergency health services. The most immediate application would be to greatly increase the chances of automatically detecting a person's current location for emergency response purposes (for instance, by clicking a pre-specified emergency button sequence on a cell phone, or dialing 911). The present invention has a unique capacity to potentially improve the prediction of location in situations where a one-time location request fails, which is frequently the case in building for technologies such as GPS (the proportion of time people spend in doors is higher than outdoors). It would do so by utilizing the historical track of data (not just one-time location requests) and explicitly handling and interpreting signal losses that occur on approach and within buildings to arrive at a predicted location. Particular population groups that would benefit from such an improved service are children in school, university students, elderly, and virtually any at-risk population group.

Utilizing the present invention more fully, the same types of emergency response applications could be greatly enhanced not only through improved location prediction, but through provision of the recent activity-travel history of a patient—such as knowing what activity they were recently participating in and how long, such as exercising, driving, working in a stationary location, etc.

A more extensive health and safety application would be as an out-patient or follow-up monitoring service. This would be particularly valuable in automatically monitoring a patient recovery with respect to regaining mobility, exercise, and return to work routines, as well as monitoring exposure to further harmful spatial spatial-temporal situations (driving, congestion) or environments (poor air quality times and locations). The present invention is advantageous in that it is automated (i.e. it does not require patient to manually record or self report), it is accurate (people have difficulty recalling times and locations accurately), and it is easily available to patient and caregivers for analysis (e.g., via web-based displays). At an advanced level, the present invention could also automatically detect erratic/unsafe behaviours or situations for immediate action, such as lost children or patients have become immobile.

In the most advanced (but least developed) health and safety application of the present invention would be to enhance the timely delivery of medication, or generate alerts/reminders concerning the need for physiological measurements. This would be amendable to medications that are known to be sensitive to activity levels (such as exercise versus stationary periods) or environmental conditions (outside activities, weather), and for providing spatially-smart reminders (such as when not in a vehicle driving). For example, blood glucose levels of diabetic patients are sensitive to such conditions, as well as other changes in routine tracked by the system. The present invention could thus be used to alert patients as to the most opportune times to measure blood glucose, take potential remedial actions, and thereby reduces the risk of harmful affects or hospital visits. A similar system would be possible for other conditions, such as cardiac patients, those with back-pain, HIV, etc. The anticipated impact would be to provide greater control of health management in the hands of the individual in a manner that caters to their existing lifestyle. In addition, this will also allow the individual to gain a greater appreciation of the affect of their work, travel, play, etc. has on their glucose levels, without the burden of keeping manual records.

Consumer Applications

Other immediate application areas for the present invention include the enhancement of the usefulness of LBS (location-based services) and provide entirely new automated analytical and reporting tools for users, their peers and the businesses they interact with. For instance, currently available LBS's could be expanded to display much more multidimensional attributes of current, recent and historical activity-travel patterns of users. With respect to individuals and their peers, the present invention would enhance "See-you-see-me" type services with "smart" information such as current, past and even future locations and activities of a user's peers/family members, not just their location. This would provide a much more informed base of information to, e.g., assist parents in actively managing their families, or employers in managing workforces. It could also provide a substantive means for people to reflect upon their daily/weekly schedule without the burden of having to manually record it—an "un-scheduling" feature, rather than just another fancy scheduling device. A range of specific analytical/display functions could be easily created, such as tallying up travel times/distance by mode (car, walk, running, etc.), time spent at home or work, time spent with other people by location (e.g., with children at home), or time spent outside under sunny conditions (in combination with weather condition data). An even wider application would be as an automated exercise tracking device, providing considerable detail on exercise types (walk, jog, bike, etc), speeds, times and distances. In the longer term, such a system could be augmented with smart (re)scheduling algorithms that constantly look for ways to achieve scheduling goals such as maximizing family time by automatically contacting one household member when another is running late.

Further applications involve consumer-business coordination. Consumers could control who, where and when their spatial-temporal information can be shared so that business could better provide for the consumer in terms set out by the consumer (and hence business benefit from increased consumer patronage). For example, consumers could allow delivery companies, such as couriers or on-line grocers, to passively query their current, past or predicted future location and activity in order to greatly increase the likelihood of receiving the package in person at a time and/or location convenient to the consumer, all without the need for direct communication. Similarly, the present invention could be utilized to filter incoming retail "sale" information such that it is allowed (and even encouraged) only when temporal and spatial conditions are met—such as being within a certain distance of the store, and only if the user is currently shopping. This is sure to increase acceptance of what is often perceived of as junk mail.

Commonalities

It should be understood that these applications involve not simply providing more-and-more information that could overwhelm the user, but rather the spatial-temporal smart display, filtering and utilization of such information in as subtle and passive a fashion as possible. The present invention goes well beyond applications that focus on the detection of the current location of the user (the "where"), to the enhanced knowledge of the users current, past, and likely future activities and their multi-dimensional attributes (the "when" and "what"), without the associated costs of manual user data entry and processing. Overall, the present invention is meant to empower people with their own information (or that of their employees or other personnel) in order to enrich their lives, or optimize expenditure of resources, by saving time and money, enhancing relationships, and improving health and safety. Advantageously, the present invention can be implemented on common hardware (e.g., cellular telephones with integrated GPS or Assisted-GPS), is fully automated (i.e. does not require manual processing of data), can adjust to varying degrees of input data accuracy and completeness, and is easily accessible via web-based interfaces and reporting, making various applications achievable at a relatively low cost.

It will be appreciated by those skilled in the art that other variations of the preferred embodiment may also be practised without departing from the scope of the invention.

What is claimed is:

1. In a message delivery system having a plurality of messages to transmit to a plurality of persons each having attributes of person-based location data and a mobile device with positional co-ordinates communications functionality, a method comprising a plurality of steps each being performed by hardware executing software, wherein the steps, for each said person, include:
   receiving the person-based location data, including the positional co-ordinates, from the mobile device;
   processing, using an activity detection means, the person-based location data in accordance with an activity detection algorithm that uses:
   missing datapoint segments;
   activity segments; and
   trip segments, wherein the activity detection algorithm:
      is probabilistic;
      converts the missing data point segments to the activity segments and the trip segments; and
      converts and joins the activity segments and the trip segments;
   converting the processed person-based location data into activity data in accordance with principles customized to the person, wherein the activity data for the person includes one or more of;
   person-based activities;
   attributes of the person-based activities; and
   predicted activity generated to predict at least the location of the person by one or more of the following:
      utilizing a historical track of the processed person-based location data; and
      handling and interpreting of signal losses from the mobile device occurring on an approach to, or at, one or more locations by refining, joining or converting the signal losses to identify the person's;
      activities;
      stops;
      trips; and
      movements; and
   transmitting one said message to the mobile device that corresponds to the activity data for the person.

2. The method of claim 1, wherein the one said message contains an instruction to the mobile device to initiate a transmission of information to a logical address.

3. The method of claim 2, wherein the instruction to the mobile device is to initiate a cellular telephone transmission to a telephone number.

4. The method of claim 1, wherein the steps further comprise, for each said person, receiving the principles customized to the person prior to the transmitting of the one said message to the mobile device that corresponds to the activity data for the person.

5. The method of claim 4, wherein the received said principles customized to the person is selected from a group consisting of:
   a pre-specified sequence of dialing numbers to be activated to initiate a corresponding transmission from the mobile device; and
   a list of logical addresses respectively corresponding to merchants to whom to transmit at least of portion of the activity data for the person.

6. The method of claim 5, wherein each said merchant in the list of merchants is selected from a group consisting of:
   a courier;
      from whom a delivery to the person is to be made; and
      to whom a probable location of the person at a predicted time is to be made known as derived from the activity data for the person; and
   a retailer from whom incoming retail "sale" information will be received at the mobile device for the person when the person is within a probable predetermined distance from a location of a store of the retailer at a predicted time when the person activity data for the person includes the activity of shopping as derived from the activity data for the person.

7. The method of claim 1, wherein the one said message contains an offer from a merchant pertaining to an activity being engaged by the person and corresponding to the activity data for the person.

8. The method of claim 7, wherein the offer from the merchant corresponds to a location proximal the positional co-ordinates received from the mobile device.

9. The method of claim 1, wherein the handling and interpreting of signal losses from the mobile device occurring on an approach to, or at, one or more locations comprises an approach to, or within, one or more buildings as are proximal to the positional co-ordinates received from the mobile device.

10. The method of claim 1, wherein the processing, using the activity detection means, of the person-based location data in accordance with the activity detection algorithm comprises:
    initial classification of the person-based location data according to one or more of:
        missing datapoint segments;
        activity segments; and
        trip segments;
    generation of summary statistics for;
        missing datapoint segments;
        activity segments; and
        trip segments; and
    refinement, according to one or more activity-based rules and/or parameters, in accordance with the activity detection algorithm, of:
        missing datapoint segments;
        activity segments; and
        trip segments;
    wherein the activity-based rules and/or parameters:
    are probabilistic;
    convert he missing data point segments to the activity segments and the trip segments; and
    convert and join the activity segments and the trip segments.

11. A non-transent computer readable medium comprising the software executed by the hardware to perform the steps of the method of claim 1.

12. The method of claim 5, wherein the comparing of the activity data for the person to the received said list of logical addresses to select one said logical address of said merchant that corresponds to the activity data for the person is a function selected from a group consisting of:
    a function to select a courier;
        from whom a delivery to the person is to be made; and
        to whom a probable location of the person at a predicted time is to be made known as derived from the activity data for the person; and
    a function to select a retailer from whom incoming retail "sale "information will be received at the mobile device for the person when the person is within a probable predetermined distance from a location of a store of the retailer at a predicted time when the person activity data for the person includes the activity of shopping as derived from the activity data for the person.

13. In a message delivery system having a plurality of messages to transmit to a plurality of persons each having attributes of person-based location data and a mobile device with positional co-ordinates communications functionality, a method comprising a plurality of steps each being performed by hardware executing software, wherein the steps, for each said person, include:
    receiving the person-based location data, including the positional co-ordinates, from the mobile device;
    processing, using an activity detection means, the person-based location data in accordance with an activity detection algorithm that uses:
        missing datapoint segments;
        activity segments; and
        trip segments, wherein the activity detection algorithm;
            is probabilistic;
            converts the missing data point segments to the activity segments and the trip segments; and
            converts and joins the activity segments and the trip segments;
    converting the processed person-based location data into activity data in accordance with principles customized to the person, wherein the activity data for the person includes one or more of:
        person-based activities;
        attributes of the person-based activities; and
        predicted activity generated to predict at least the location of the person by one or more of the following:
            utilizing a historical track of the processed person-based location data; and
            handling and interpreting of signal losses from the mobile device occurring on an approach to, or within, one or more buildings as are proximal to the positional co-ordinates received from the mobile device by refining, joining or converting the signal losses to identify the person's:
                activities;
                stops;
                trips; and
                movements; and
    transmitting one said message to the mobile device that corresponds to the activity data for the person, wherein the one said message contains an offer from a merchant that:
        pertaining to an activity being engaged by the person and corresponding to the activity data for the person; and
        corresponds to a location proximal the positional co-ordinates received from the mobile device.

14. The method of claim 13, wherein the processing, using the activity detection means, of the person-based location data in accordance with the activity detection algorithm comprises:
    initial classification of the person-based location data according to one or more of:
        missing datapoint segments;
        activity segments; and
        trip segments;
    generation of summary statistics for:
        missing datapoint segments;
        activity segments; and
        trip segments; and
    refinement, according to one or more activity-based rubs and/or parameters, in accordance with the activity detection algorithm, of:
        missing datapoint segments;
        activity segments; and
        trip segments;
    wherein the activity-based rules and/or parameters:
    are probabilistic;
    convert the missing data point segments to the activity segments and the trip segments; and convert and join the activity segments and the trip segments.

15. A non-transient computer readable medium comprising the software executed by the hardware to perform the steps of the method of claim 13.

16. The method as defined in claim 1, wherein the person-based location data received from the mobile device further comprises physiological person-based data for the person.

17. The Method as defined in claim 16, wherein the one said message transmitted to the mobile device further corresponds to the physiological person-based data for the person.

18. The method as defined in claim 16, wherein the physiological person-based data for the person is selected from a group consisting of:
- a heart-rate for the person;
- a blood glucose measurement for the person;
- a physical activity level for the person (via accelerometer);
- an ambient environmental condition for the person; and
- a combination of the foregoing.

19. The method as defined in claim 18, wherein the ambient environmental condition for the person for the person is selected from a group consisting of:
- an ambient air quality for the person; and
- an ambient weather condition for the person; and
- a combination of the foregoing.

20. The method as defined in claim 16, wherein the one said message transmitted to the mobile device includes information for the person selected from a group consisting of:
- timely delivery of medication for the person;
- timely physiological measurement for the person; and
- a combination of the foregoing.

21. The method as defined in claim 16, wherein the one said message transmitted to the mobile device includes information for the person selected from a group consisting of:
- a blood glucose level measurement for the person;
- a remedial action as a function of the blood glucose level measurement for the person; and
- a combination of the foregoing.

* * * * *

UNITED STATES PATENT AND TRADEMARK OFFICE
CERTIFICATE OF CORRECTION

| | | |
|---|---|---|
| PATENT NO. | : 8,606,497 B2 | Page 1 of 1 |
| APPLICATION NO. | : 11/556365 | |
| DATED | : December 10, 2013 | |
| INVENTOR(S) | : Sean T. Doherty, Lukasz Cwik and Dominik Papinski | |

It is certified that error appears in the above-identified patent and that said Letters Patent is hereby corrected as shown below:

In the Claims

Column 22, Claim 14, Line 58, "rubs" should be --rules--.

Signed and Sealed this
Fourteenth Day of October, 2014

Michelle K. Lee
*Deputy Director of the United States Patent and Trademark Office*